N. M. BAKER AND H. K. PARSONS.
OPHTHALMIC MOUNTING.
APPLICATION FILED DEC. 13, 1916.
1,303,628.
Patented May 13, 1919.
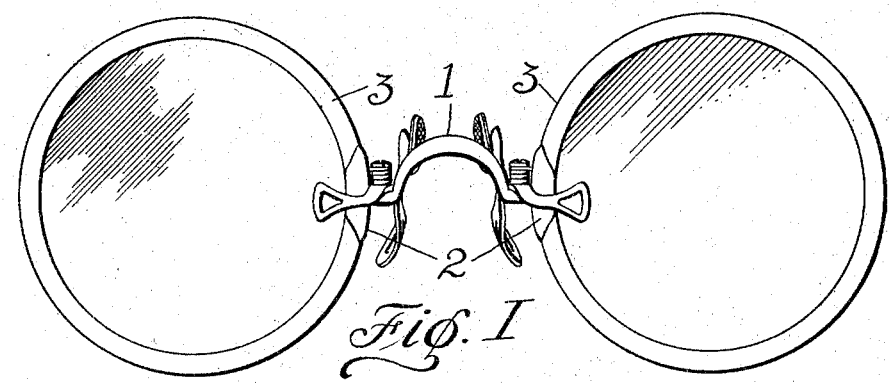
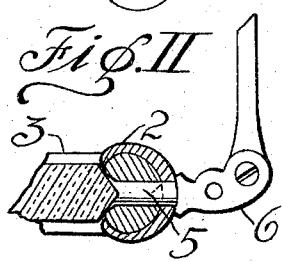
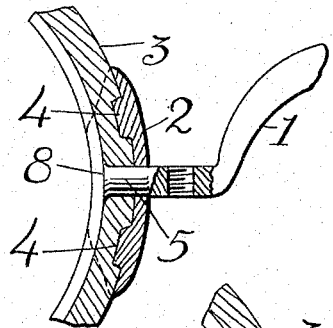
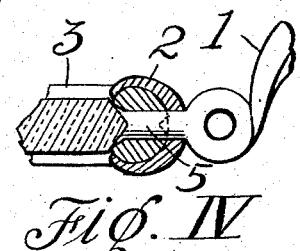
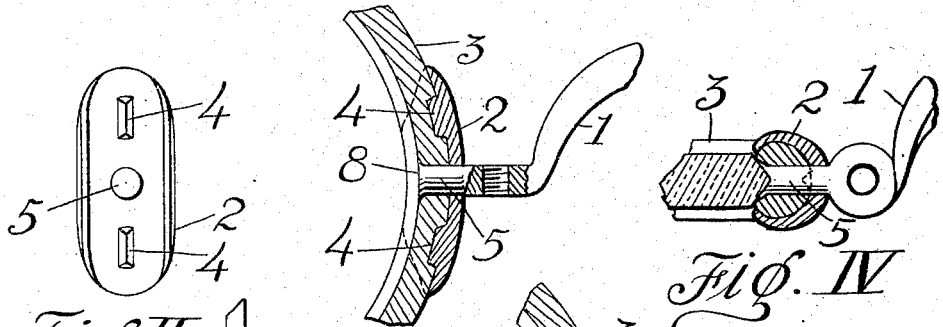
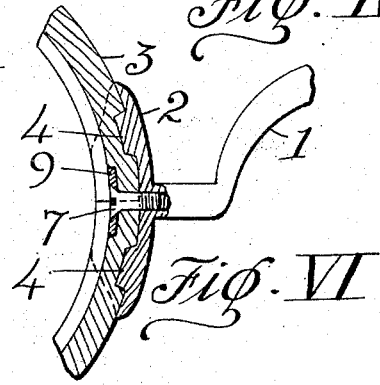
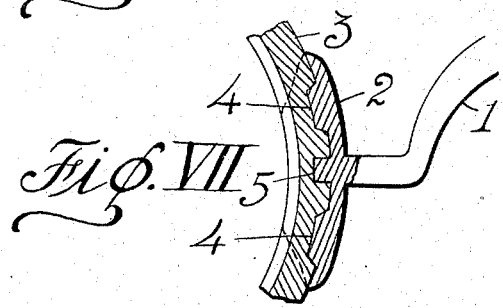
INVENTOR
Nelson M. Baker
Harold K. Parsons
BY
H. H. Styll   H. K. Parsons
ATTORNEYS

UNITED STATES PATENT OFFICE.

NELSON M. BAKER AND HAROLD K. PARSONS, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,303,628. Specification of Letters Patent. Patented May 13, 1919.

Application filed December 13, 1916. Serial No. 136,692.

*To all whom it may concern:*

Be it known that we, NELSON M. BAKER and HAROLD K. PARSONS, citizens of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to that type of mounting embodying a metallic center and a non-metallic rim member.

One of the leading objects of the present invention is the provision of novel and improved means for securely and readily uniting the said parts.

A further object of the present invention is the provision of a novel manner of attaching a metallic fitting to a non-metallic rim, which may be employed in connection with either a bridge center, a temple or other desired fitting.

Other objects and advantages of our improved construction should be readily apparent by reference to the following specification taken in connection with the accompanying drawings, and it will be understood that we may make any modifications in the specific details of construction shown and described within the scope of the appended claims without departing from or exceeding the spirit of our invention.

Figure I represents a front view of a mounting embodying our improvement.

Fig. II represents a view of the inside of the strap or fitting member.

Fig. III represents a longitudinal sectional view of the fitting applied to a rim.

Fig. IV represents a transverse sectional view at right angles to Fig. III.

Fig. V represents a similar view of a temple construction.

Fig. VI is a longitudinal sectional view of a modified form of the invention.

Fig. VII represents a sectional view of a slightly modified construction.

In the drawings, in which similar characters of reference are employed to denote corresponding parts throughout the several views, the numeral 1 designates the bridge of the ophthalmic mounting, which in the present instance has been shown as of finger-piece construction, having at each end the curved clip member 2 embracing the preferably non-metallic rim 3.

The clip member 2, as should be best understood by reference to Fig. IV, is so applied to the frame 3 as to fit therearound and clampingly engage the frame to retain it in position. In addition to the clamping action for securing the frame, however, we provide the interior of the clip with the inwardly extending lugs or bosses 4 adapted to bite into the outer edge of the material of the frame and aid in locking it against any accidental rotative or slipping movement while to additionally secure the frame we provide the fastening member 5, which may be an inward continuation of the bridge 1 or end piece 6, as the case may be, or may be a separate screw or fastening device 7, as illustrated in Fig. VI. In any event the fastening member extends entirely through the frame and is provided on its inner end with the head 8, tightly clamping against the inner face of the frame to retain it in place. This securing in place is preferably formed by riveting or heading over the end of the inwardly projecting member to cause it to bite into the material of the frame.

In Fig. VI, however, we have illustrated a construction particularly adapted for those cases when it is desired to put out the fitting separate from the frame, and capable of advantageous use when the dealer desires to carry a stock of fittings only and to fit frames of different sizes as required to the metallic parts.

An additional advantage attained by the form shown in Fig. VI is that it is particularly applicable when desiring to use straight strip framing for the lens in place of a molded or one piece frame or rim. This is due to the fact that in Fig. VI, we have employed a separate fastening device or screw 7 which may be used either alone or in connection with an anchoring washer 9, the advantage of the washer being that the washer can be shaped to fit the edge of the lens and can extend or overlap the joint without interfering with the fitting of the lens a greater amount than could an ordinary screw head without considerable countersink.

In the use of this type of construction it is merely necessary to fit the rim 3 around the lens, cutting it off to exact desired length and to then press the ends of the rim when joined against the lugs or points 4, and form notches in the ends of the frame to receive the fastening member 7, tightening of the fastening member 7 securely pressing the frame ends onto the points 4 and both locking the frame in the clip and preventing any possible spreading of the ends.

If desired the sides of the clip 2 may then be curved around and caused to bite into the frame to supplement the securing action of the member 7.

From the foregoing description taken in connection with the accompanying drawings, the structural features and advantages of our improved construction should be readily apparent and it will be seen that we have provided a simple, novel and efficient clip, which may be satisfactorily employed to firmly secure a non-metallic or other lens frame in position, and that on account of the coöperating features of the inwardly projecting points, the lateral clamping edges and the central headed securing member, these frames are held with the utmost rigidity, while the coöperation of the several features overcomes any possible weakening of the parts as might occur were only the central rivet without the continuous lateral clamping edges employed, or were only the points employed without the central reinforcing and clamping rivet holding the frame against those points.

While we have previously described our construction as particularly adapted to have the end of the member 5 or 7 extending through the lens provided with a head or riveted over portion engaging the inner face of the zylonite or composition frame member, to aid in securing it within the clip, it is to be understood that we may, if preferred, form the member 5 as shown in Fig. VII, in which event the member extends but partially through the rim, the aperture either being drilled through the rim or but a deep socket formed in the outer face to receive this projecting lug or tang 5. Our mounting in this event will embody the clip member having the pair of inwardly projecting lugs 4 to bite into the frame member, the tang 5 to fit deeper into the frame member in the socket formed to receive the same and the laterally embracing portions of the clip clamping and securly engaging and retaining the frame member, this clamping action serving to unite the parts while the interlocking of the lugs 4 and especially of the projection 5 with the frame or rim member absolutely eliminates any liability of rotative or twisting movement of the frame member within the clip and insures a firm and secure connection between the several parts.

We claim:

1. In a device of the character described, the combination with a trough-like clip member having inwardly projecting points, of a frame fitting within the trough and interlocking with the points, and an additional member projecting through the clip member and engaged with the frame for more firmly interlocking the clip therewith.

2. In a device of the character described, the combination with a metallic fitting and a non-metallic rim member, of means for connecting the parts, comprising a clip embracing the rim member and clampingly engaging the same, projections formed on the inner face of said clip adapted to be pressed to bite into the frame, and an additional member projecting through the rim member and co-engaged with the clip between the projections for more firmly interlocking the clip with the rim.

3. In a device of the character described, the combination with a trough-like clip member having inwardly projecting points adjacent the ends thereof, of a frame fitting within the trough and interlocking with the points, and an additional member extending through the frame and co-engaged with the clip member between the points for more firmly interlocking the rim and clip member.

In testimony whereof we affix our signatures in the presence of two witnesses.

NELSON M. BAKER.
HAROLD K. PARSONS.

Witnesses:
 EDITH M. HALVORSEN,
 ESTHER M. LAFLER.